(12) United States Patent
Panteleev et al.

(10) Patent No.: US 10,499,272 B2
(45) Date of Patent: Dec. 3, 2019

(54) MEASUREMENT FOR DEVICE-TO-DEVICE (D2D) COMMUNICATION (71) Applicant: INTEL CORPORATION, Santa Clara, CA (US)

(72) Inventors: Sergey Panteleev, Nizhny Novgorod (RU); Alexey Khoryaev, Nizhny Novgorod (RU); Sergey Sosnin, Zavolzhie (RU); Andrey Chervyakov, Nizhny Novgorod (RU)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 15/742,806

(22) PCT Filed: Dec. 24, 2015

(86) PCT No.: PCT/US2015/000350
§ 371 (c)(1),
(2) Date: Jan. 8, 2018

(87) PCT Pub. No.: WO2017/026977
PCT Pub. Date: Feb. 16, 2017

(65) Prior Publication Data
US 2018/0206140 A1 Jul. 19, 2018

Related U.S. Application Data (60) Provisional application No. 62/203,740, filed on Aug. 11, 2015.

(51) Int. Cl.
H04W 24/10 (2009.01)
H04L 5/00 (2006.01)
(Continued)

(52) U.S. Cl.
CPC .......... *H04W 24/10* (2013.01); *H04B 17/309* (2015.01); *H04L 5/0053* (2013.01);
(Continued)

(58) Field of Classification Search
CPC combination set(s) only.
See application file for complete search history.

(56) References Cited

U.S. PATENT DOCUMENTS

2004/0004998 A1* 1/2004 Fitton ............... H04L 1/0003
375/219
2015/0085818 A1* 3/2015 Huang ............... H04L 5/0037
370/330
(Continued)

OTHER PUBLICATIONS

International Search Report and Written Opinion for International Patent Application No. PCT/US2015/000350 dated Apr. 12, 2016; 13 pages.
(Continued)

*Primary Examiner* — Warner Wong
(74) *Attorney, Agent, or Firm* — Schwabe, Williamson & Wyatt, P.C.

(57) ABSTRACT

An electronic device for device-to-device (D2D) communication comprises receive circuitry to receive an indication of D2D resources for D2D communication, and processing circuitry to evaluate a time and frequency selective measurement of one or more of the D2D resources, based on the indication.

10 Claims, 7 Drawing Sheets (51) Int. Cl.
   *H04W 76/14*     (2018.01)
   *H04W 48/16*     (2009.01)
   *H04B 17/309*    (2015.01)
   *H04W 72/04*     (2009.01)
   *H04W 72/08*     (2009.01)
   *H04W 88/04*     (2009.01)

(52) U.S. Cl.
   CPC ......... *H04W 48/16* (2013.01); *H04W 72/042* (2013.01); *H04W 72/044* (2013.01); *H04W 76/14* (2018.02); *H04W 72/085* (2013.01); *H04W 88/04* (2013.01)

(56) References Cited

U.S. PATENT DOCUMENTS

| | | | |
|---|---|---|---|
| 2015/0215903 A1* | 7/2015 | Zhao | H04W 72/04 370/329 |
| 2016/0249311 A1* | 8/2016 | Yu | H04W 4/70 |
| 2016/0286374 A1* | 9/2016 | Baghel | H04W 76/14 |
| 2016/0338019 A1* | 11/2016 | Ratasuk | H04L 5/001 |

OTHER PUBLICATIONS

Intel Corporation; "Discussion on D2D Operation within Network Coverage (Mode-1)," 3GPP TSG RAN WG1 Meeting #76bis, R1-141164; Agenda Item: 7.2.7.2.2; Shenzhen, China, Mar. 31-Apr. 4, 2014; 7 pages.

Intel Corporation; "Discussion on the D2D demodulation performance requirements," 3GPP TSG-RAN WG4 Meeting #74bis, R4-152139; Agenda Item: 6.5.2; Rio de Janeiro, Brazil, Apr. 20-24, 2015; 9 pages.

* cited by examiner

Inter-cell relay

Aggregation of DL and inter-cell relay

MEASUREMENT FOR DEVICE-TO-DEVICE (D2D) COMMUNICATION

CROSS REFERENCE TO RELATED APPLICATIONS

The present application is a national phase entry under 35 U.S.C. § 371 of International Application No. PCT/US2015/000350, filed Dec. 24, 2015, entitled "MEASUREMENT FOR DEVICE-TO-DEVICE (D2D) COMMUNICATION", which claims priority to U.S. Provisional Patent Application No. 62/203,740, filed Aug. 11, 2015, and entitled "METHOD OF TIME-FREQUENCY SELECTIVE SIDE-LINK MEASUREMENTS FOR ENHANCED D2D RELAYING", the entire disclosures of which are hereby incorporated by reference in their entireties.

TECHNICAL FIELD

Embodiments of the disclosure herein generally may relate to the field of wireless communications.

BACKGROUND

LTE networks may provide for device-to-device (D2D) communication.

BRIEF DESCRIPTION OF THE DRAWINGS

Embodiments described herein are illustrated, without limitation, by way of example, in the accompanying drawings.

DESCRIPTION OF EMBODIMENTS

The following detailed description may refer to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of embodiments. However, it will be apparent to those skilled in the art having the benefit of the present disclosure that the various embodiments claimed may be practiced in other examples that depart from these specific details. In certain instances, descriptions of well-known devices, circuits, and techniques are omitted so as not to obscure the description of the embodiments with unnecessary detail.

This disclosure may provide new techniques for sidelink measurements that may be used for enhanced interference management in LTE networks with enabled device-to-device (D2D) communication. Disclosed measurement procedures may be used for evolved NodeB (eNB) controlled D2D communication in order to reduce impact from/on cellular transmissions as well as for advanced user equipment to network (UE-to-NW) relay selection procedures in order to optimize traffic management and offloading using the sidelink air-interface (D2D communication). In addition, these measurements may be used to make a decision for channel access in case of user equipment (UE) autonomous D2D communication.

This disclosure may define new time and frequency selective sidelink measurements for SL-RSRP, SL-RSRQ, and SL-RSSI.

The D2D communication in cellular technologies may suffer from different types of interference that may significantly degrade the sidelink performance. For example, the presence of multiple interference types may significantly complicate the control of the interference environment. Therefore, there are advantages to controlling and managing the quality of the sidelink.

In LTE systems, the D2D interference may be time and/or frequency selective depending on eNB scheduling behavior and resource allocation. For instance, in each subframe an eNB may schedule different cellular transmitters that may inject a significant amount of interference to the D2D receiver. In order to detect and avoid such a situation, the target D2D receiver may conduct time and frequency-selective D2D measurements. For instance, the subframe set specific received signal strength indicator (RSSI) measurement may be used to check at which subframes the impact from interference is significant. This information, if available, can be used to optimize time resource pattern of sidelink and/or cellular transmission and/or apply different channel quality indication (CQI) values for different time transmission patterns and/or decide whether to use cellular or direct path in order to deliver traffic to/from a target UE.

The D2D communication enabled in LTE Release 12 may be broadcast based and may not support any measurements, and therefore its practical use may be limited to the relatively low rate broadcast services.

Embodiments in this disclosure may be directed to enable eNB controlled D2D communication for delivery of the direct traffic and/or routing the cellular traffic over sidelink using the sidelink air-interface. In embodiments, this interference aware approach may be easily integrated into the future LTE Releases in order to improve the sidelink performance. In addition the disclosed measurements may be used to trigger UE-autonomous D2D communication.

Two non-limiting examples of eNB controlled communication over sidelink, without affecting the generality of use cases, may include:

Direct traffic management. For direct traffic management, the eNB may make a decision whether the direct traffic should be routed through the eNB or a sidelink. In this case, the eNB may be informed about radio conditions at the target UE on the sidelink.

Cellular traffic management. For cellular traffic management the eNB may make a decision whether to use a cellular path or route the traffic through a Relay UE using a sidelink air-interface.

Examples may be directed to eNB controlled sidelink communication, which may also be referred to as sidelink transmission mode-1 (Mode-1) defined in LTE Rel.12. In embodiments, measurements may be also generalized for UE-autonomous sidelink transmission (Mode-2).

Overview

For Mode-1 D2D communication, the eNB may assign the spectrum resources for D2D transmission. For this purpose, the DCI Format 5 (D2D grant) was introduced in LTE Re1.12. This grant may be transmitted by eNB in (e)PDCCH channel and may indicate assigned resources to D2D transmitter in physical sidelink control channel (PSCCH) and physical sidelink shared channel (PSSCH) respectively. The PSSCH may be used for direct communication between two terminals, while the PSCCH may be an analogue of cellular PDCCH channel in sidelink, where D2D transmitter may send the L1 control information (for example: MCS index, time resource pattern of transmission, hopping and frequency resource allocation) to D2D receivers, so that the receivers may decode subsequent data.

Sidelink resource configuration may be slightly different between Mode-1 and Mode-2. In Mode-2, the subframes allocated for PSCCH 120 and associated PSSCH resource pools 120 may be indicated by a bitmap mechanism. For Mode-1, PSSCH pool 125 subframes 1251-125n may be all UL subframes that do not belong to PSCCH 120, which may also be allocated using bitmap signaling. The important observation from this allocation approach is that not all UL subframes may be used for sidelink communication. In terms of frequency resource, the sidelink pool may also occupy a part of the UL spectrum depending on resource pool configuration parameters describing allocation in frequency domain, for example, physical resource blocks (PRBs) used for transmission.

The sidelink transmission may happen within time-frequency resources of PSCCH/PSSCH resource pools. The actual time resources used for transmission within a pool are separately signaled with help of PSCCH resource index ($n_{PSCCH}$) and time resource pattern index $I_{TRP}$ (in case of PSSCH) respectively. The frequency allocation within PSSCH 120 may be similar to an allocation used in UL grant with the main difference that assigned frequency resources may be addressed within frequency resources of the PSSCH pool 125. The frequency resource of PSCCH 120 may be determined by the PSCCH resource index ($n_{PSCCH}$).

Figure 1:
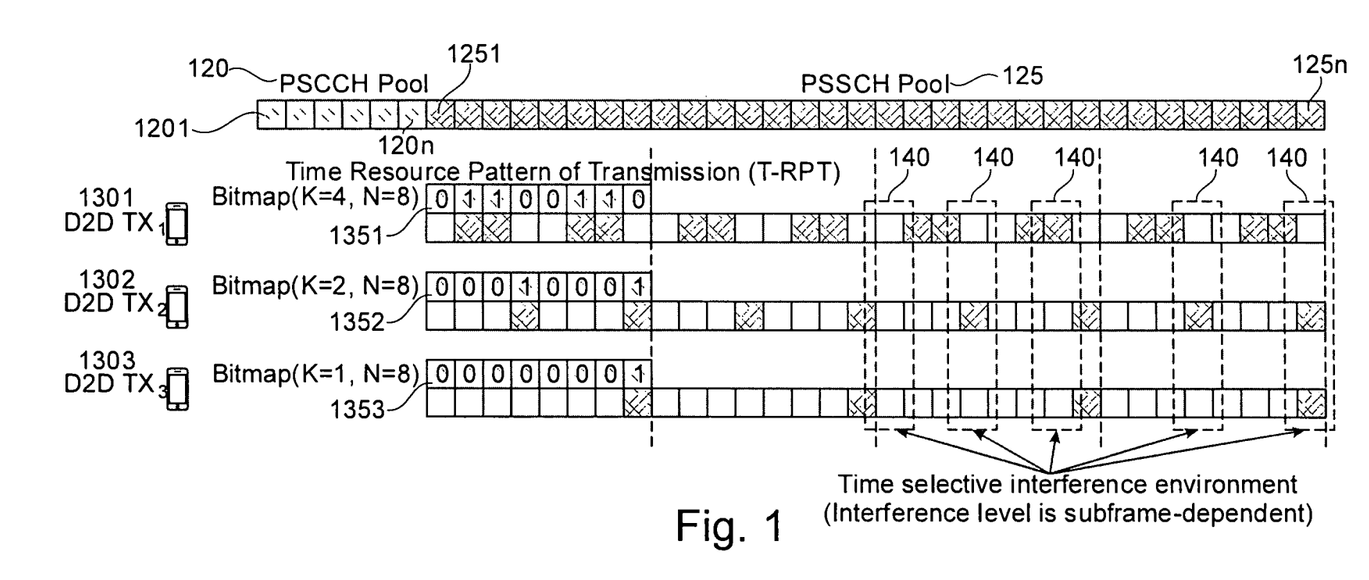
FIG. 1 illustrates time selective interference due to D2D intra/inter-cell interference.
Figure 2:
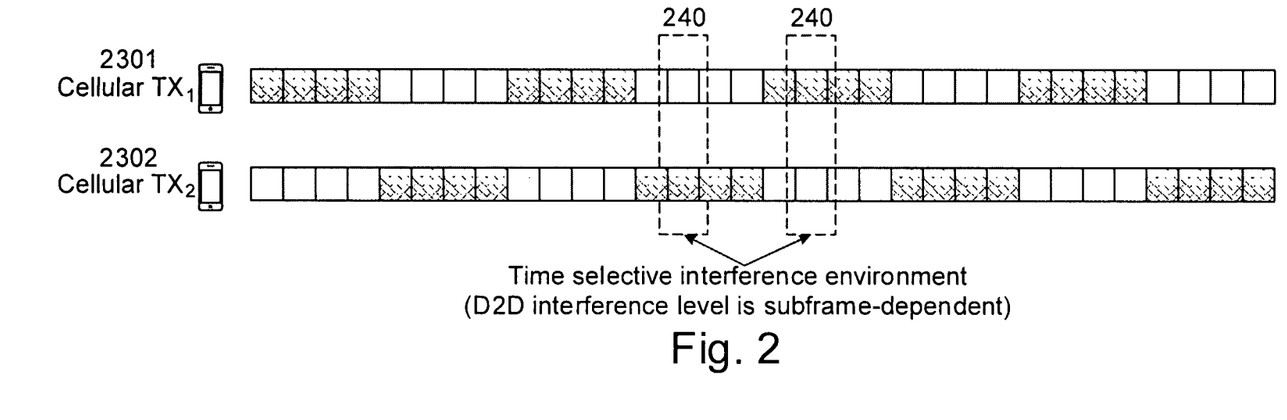
FIG. 2 illustrates time selective interference due to cellular intra/inter-cell interference.
Figure 3:
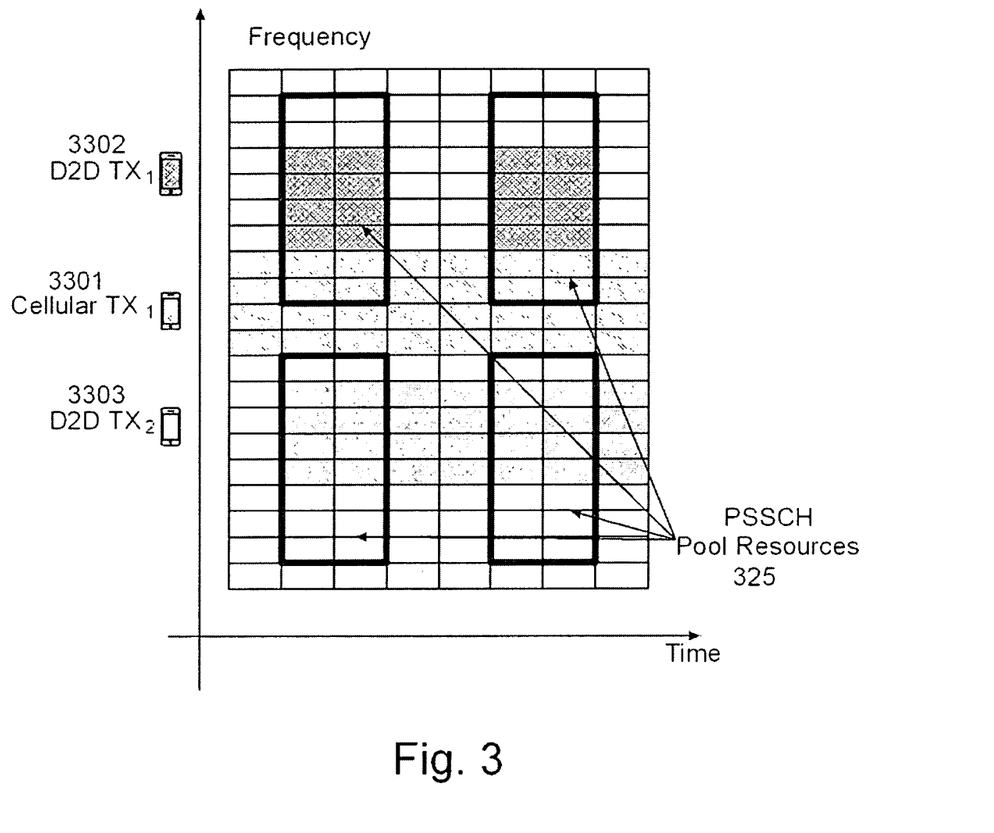
FIG. 3 illustrates frequency selective interference due to cellular intra/inter-cell interference.

Because of flexible resource allocation for sidelink communication, the interference environment on sidelink resources may be time and frequency selective (see FIGS. 1, 2, 3).

FIG. 1 illustrates interference arising from D2D devices, which may be in the same cell or nearby in a different cell. A PSCCH pool 120, including subframes 1201-120n and a PSSCH pool 125 having subframes 1251-125n is shown. Three different D2D transmitters are shown 1301-1303. Each of the D2D transmitters has an associated Time Resource Pattern of Transmission (T-RPT) 1351-1353. T-RPT indicates the subframes of the PSSCH pool 125 in which a particular D2D transmitter 1301-1303 may transmit. Shading illustrates subframes in which each of the D2D transmitters 1301-1303 transmits. This arrangement may lead to an interference environment that changes from subframe to subframe, as illustrated by the different shading combinations in the highlighted subframes 140.

FIG. 2 illustrates a time-selective interference environment due to a pair of cellular transmitters 2301-2302. Shading indicates subframes in which a particular cellular transmitter is transmitting. Highlighted subframes 240 illustrate the changing interference environment due to transmissions by the cellular transmitters.

FIG. 3 illustrates time and frequency resource usage in a schematic example. PSSCH pool resources 325 may include a subset of the available subsets, as illustrated in FIG. 3. Shading illustrates transmission by 1 cellular transmitter 3301 and two D2D transmitters 3302-3303.

A problem of such a highly dynamic and time-frequency selective environment is that a single eNB may not be able to fully control it, and degradation of D2D or cellular communication may happen due to intra- and/or inter-cell interference caused by cellular or D2D transmissions. In this case, coordinated interference management across multiple cells may be advantageous. However, even in this case, in order to make a preliminary decision on feasibility and potential quality of the sidelink path or particular relay routing path the D2D receiver may make a coarse estimation of the interference environment and may report relevant indicators to the eNB.

In embodiments, time and frequency selective interference issues for sidelink communication may be avoided by restricting the number of utilized T-RPTs ($i_m$p) to a small subset or to use one or a few patterns in extreme case. The same approach may be applied to frequency allocation, so that wideband allocation or subset of frequency resources with predefined granularity may be used. The coordinated configuration of resources used for cellular and D2D transmission across cells may be also beneficial for control of an interference environment. However, these approaches may reduce system flexibility and even if restrictions on available sidelink (D2D) resources are introduced, the time-frequency selective nature of interference from cellular transmission may exist, since, in embodiments, there may be no restrictions on eNB scheduling flexibilities. Moreover, the restriction may eventually result in decreased system performance. Therefore, time-frequency selective approaches may be enabled for sidelink measurements in order to coarsely characterize the sidelink communication environment at the allocated spectrum resources (resource of interest). According to some examples, such measurements may be performed only in relation to subframes in the resource of interest.

Time and Frequency Selective Sidelink RSSI Measurements (SL-RSSI)

In embodiments, one measurement may be the time and frequency selective sidelink received signal strength indicator measurement. The sidelink received signal strength indicator measurements in UL spectrum resources may take into account the overall received power by a D2D receiver and thus may characterize an interference environment including intra-/inter-cell D2D and cellular interference at the particular time-frequency resource.

Figure 4:
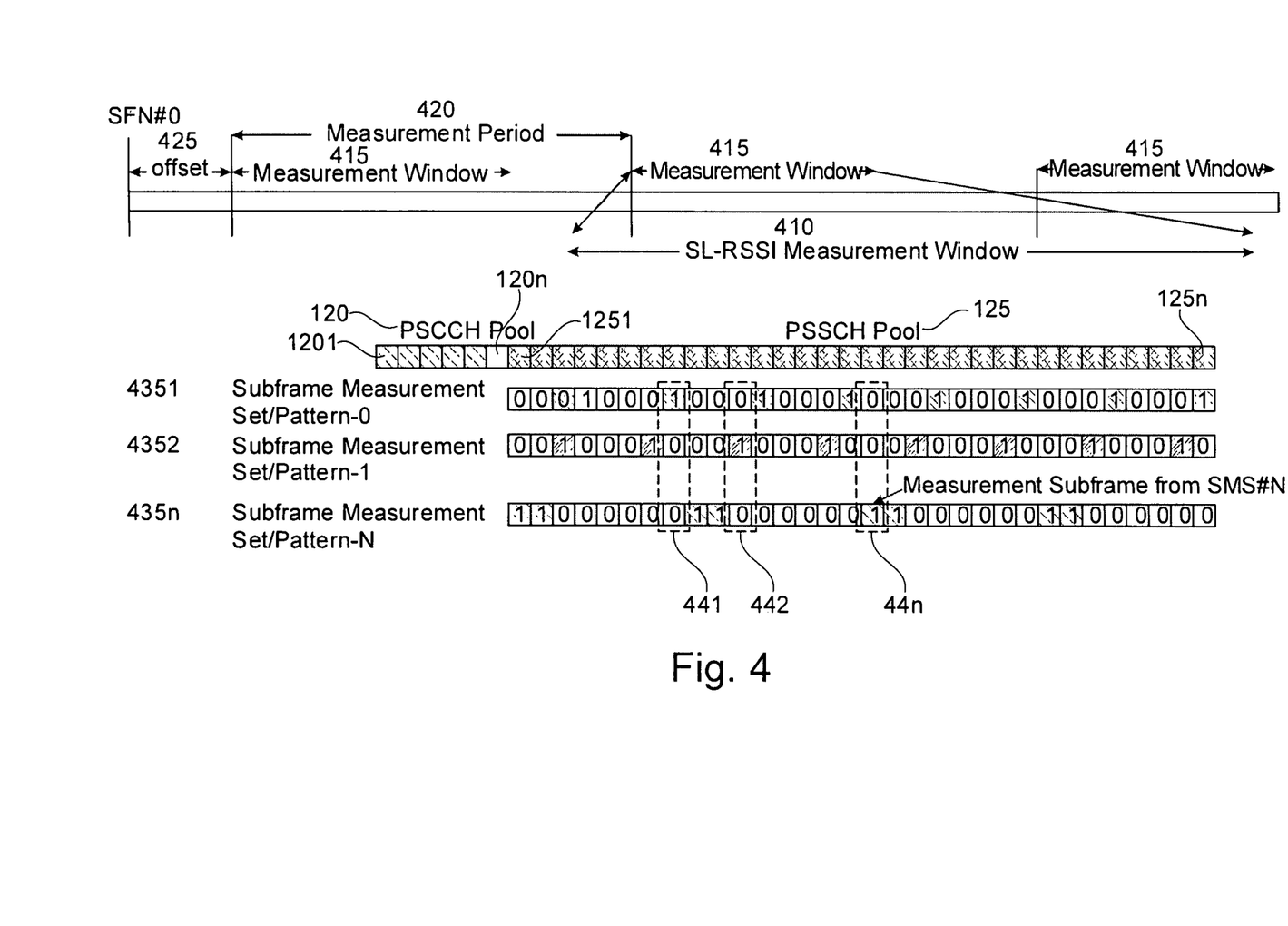
FIG. 4 illustrates time Selective Sidelink RSSI Measurements.

In embodiments, the eNB may configure the UE to measure SL-RSSI on pre-configured sidelink RSSI measurement resources. The SL-RSSI measurements and/or reporting may be periodical or event-triggered by eNB. In order to perform SL-RSSI measurements, eNB may configure UE using higher-layer signaling (e.g. SIB, RRC signaling) with multiple SL-RSSI subframe measurement sets, which, in embodiments, may measure received signal strength and may analyze its variation across different subframes measurement sets. FIG. 4 illustrates example timings of SL-RSSI measurements. Each subframe set specific SL-RSSI measurement resources may be configured within pre-configured measurement windows/gaps 410 allocated using configurable duration 415, period 420 and offset 425 values e.g. relative to system frame number—0 (SFN0). Depending on configuration signaling, these measurement windows 410 may or may not be aligned with sidelink resource pools, e.g.

PSSCH 125 and/or PSCCH 120. Within measurement windows 410, the eNB may configure multiple, for example up to N, where N=1, 2, 3, 4, . . . etc.) subframe measurement sets (SMS) 4351-435n, that may be configured using bitmap or repeated bitmap signaling. Alternatively, eNB may directly configure multiple subframe measurement patterns (SMP) 4351-435n that can be used to perform UE measurements. In embodiments, the UE may be expected to measure SL-RSSI on at least one subframe of the subframe measurement set within the measurement window 410 or combine measurement from multiple subframes 1251-125n that belong to the same set/pattern depending on higher layer configuration. In case of subframe measurement patterns, in embodiments, the window duration 415 may be configured in order to filter out the outdated measurements. FIG. 4 highlights one measurement subframe for each of the illustrated subframe measurement sets/patterns. The highlighted measurement subframes are 441, 442 and 44n, respectively corresponding with set/pattern 0, 1 and N.

In embodiments, for each SL-RSSI subframe measurement set/pattern, the eNB may configure the UE to perform wideband measurements or narrowband measurements and may provide the frequency resource configuration over which SL-RSSI measurements may be done. In some embodiments, the UE may be to perform narrowband SL-RSSI measurements over preconfigured frequency subbands or resources of the overall available spectrum.

Figure 5:
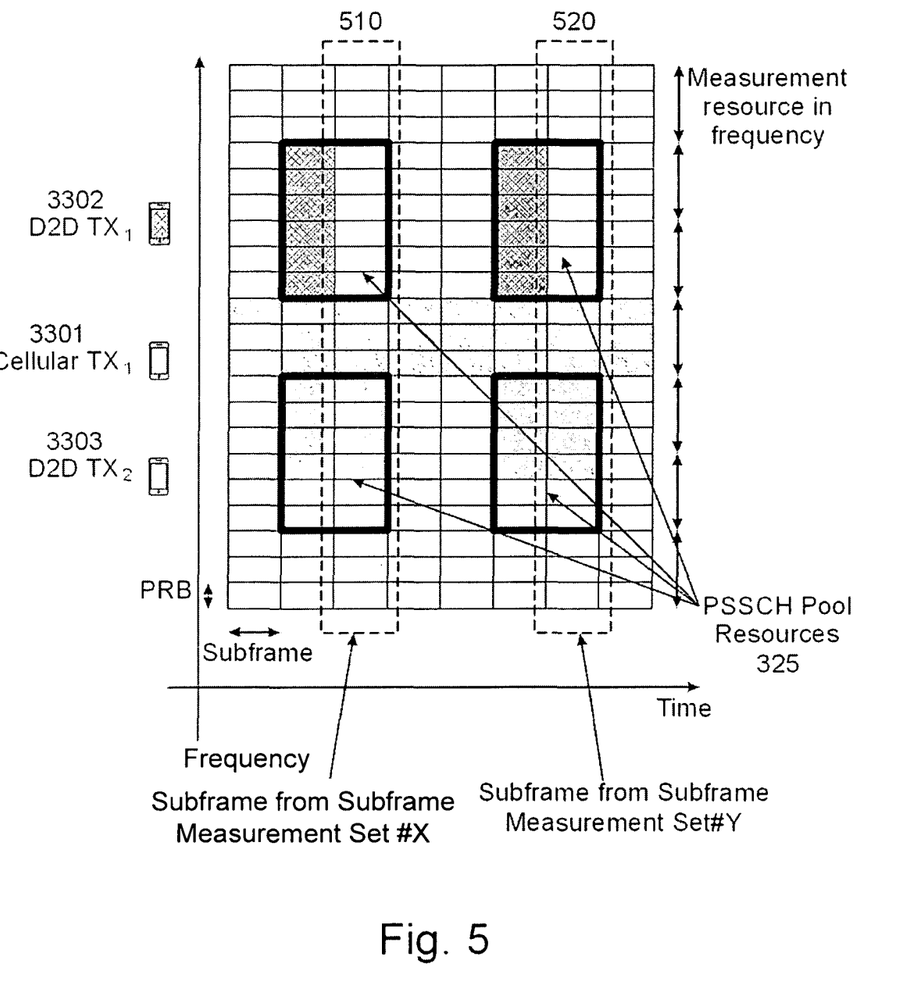
FIG. 5 illustrates Time and Frequency Selective Sidelink RSSI Measurements.

FIG. 5 illustrates time and frequency selective SL-RSSI measurements. Measurements may be performed for one or more particular PRBs in a particular subframe within the PSSCH pool resource. FIG. 5 illustrates example subframe measurement sets 510 and 520. As illustrated, these are wideband measurements across a number of PRBs. In other examples, measurement could be performed over fewer PRBs.

The SL-RSSI measurements may be reported back to eNB using higher layer signaling (MAC or RRC, etc.) or delivered to the D2D TX (transmitter). These measurements together with cellular RSRP/RSRQ information and/or SL-RSRP/SL-RSRQ may be used to make a decision on the transmission path selection and/or may be used to determine the best time pattern for sidelink transmission ($I_{TRP}$) from the configured subset of the available sidelink transmission patterns. In embodiments, multiple subframe measurement sets may be also to evaluate the impact from different interference types under eNB control. In embodiments, the separate measurement resources may be to evaluate the impact from different interference types as described below.

In embodiments, the time and frequency selective SL-RSSI measurements may be generalized to UL-RSSI measurements in a sense that these measurements may be done outside of sidelink resources allocated by the eNB. In embodiments, from LTE specification perspective, DL-RSSI measurements may be extended to the UL subframes. In embodiments, from a system level perspective, the more time frequency selective measurements and corresponding reporting may be beneficial.

Time and Frequency Selective Sidelink Interference Signal Strength Indicator (SL-ISSI)

To differentiate impact from the overall intra- and/or inter-cell interference or from different interference types (D2D and/or cellular interference), additional measurement resources may be to explicitly measure the impact from the particular interference type. These measurement resources may be configured separately from the SL-RSSI resources and may have more complex physical structure and configuration. The configuration of these interference signal strength indicator (ISSI) resources may involve coordination signaling across multiple cells to capture levels of different interference types in time and frequency selective manner. In embodiments, the eNB may exchange information about time-frequency resources used for D2D transmissions and/or information on recommended interference measurement resources for different transmission types. The explicit differentiation of the interference types may be used by eNB to optimize system performance or may be used by D2D TX in order to improve sidelink performance, e.g. using sidelink and/or uplink power control mechanisms. In one embodiment, the ISSI measurements may be transparent across UEs and carried out through RSSI measurements; however, explicit measurements may provide more information for optimization of D2D communication metrics.

Time and Frequency Selective Sidelink RSRP Measurements (SL-RSRP)

The eNB may configure the UE to carry out sidelink RSRP (SL-RSRP) measurements over different sidelink physical channels, such as PSDCH, PSCCH or PSSCH. In order to conduct these measurements, the eNB may configure D2D receivers with time-frequency resources used for these channels, which may be derived from SIB18 and SIB19, and may configure demodulation reference signals (DMRS) used by D2D transmitters. Alternatively, the SL-RSRP measurements may be done using sounding reference signals.

For SL-RSRP measurement over PSSCH, the D2D receiver may decode the PSCCH to get information about DMRS physical structure and transmission pattern, for example, time-frequency resources, hopping parameters and parameters related to the DMRS sequence generation, such as destination identity. In embodiments, the eNB may configure the UE with time-frequency resources and corresponding DMRS signal parameters to perform measurements. In this case, the D2D receiver may be able to accurately measure the SL-RSRP for a given D2D transmitter inside of a sidelink communication channel. These measurements may be further used to estimate time and/or frequency selective SL-RSRQ.

Time and Frequency Selective Sidelink RSRQ Measurements (SL-RSRQ)

The sidelink RSRQ (SL-RSRQ) measurements may be defined over different sidelink physical channels, such as PSDCH, PSCCH or PSSCH. In order to perform these measurements, UE may measure SL-RSRP from the target D2D transmitters in the configured resources and may perform time-frequency selective SL-RSSI or SL-ISSI measurements. The set of time-frequency selective SL-RSRQ measurements may be obtained by division of SL-RSRP value by SL-RSSI or SL-ISSI in the configured measured resources. Given that the latter measurements are time and frequency selective, the UE or eNB may derive SL-RSRQ for each configured measurement resource also in the time frequency selective manner.

The SL-RSRQ measurements may be mapped to a CQI value, which may represent a coarse or initial value to characterize sidelink quality, i.e. the spectral efficiency corresponding to a particular time-frequency resource set for a particular transmission point. The calculated CQI value may be used to predict capacity of a link in the presence of a particular set of interference sources.

In some examples, the measurements described above may be used to make a decision as to the best sidelink transmission point in the case of cellular traffic relaying over a sidelink, or may be used to decide on the use of cellular or direct transmission path in the presence of relay terminals.

The combination of sidelink RSRP/RSRQ from different transmission points (D2D TXs) may be also used to predict which D2D transmitter may share the time-frequency resources in communication channel without causing a significant amount of interference for receivers, so that eNB may form multiple hypothesis on joint sets of D2D and/or cellular transmitters which may spatially reuse the time-frequency resources (e.g. due to spatial isolation).

Usage of Sidelink Measurements for Relay Operation

In embodiments, sidelink measurements may be used to form a Relay Candidate Set (RCS) for a particular target UE. In embodiments, each UE with SL-RSRP/SL-RSRQ within some range measured on a link to the target UE may be included to the RCS. In embodiments, both sidelink (SL) and cellular measurements are used to decide the RCS. The size of RCS may be set to some configured or preconfigured value in order to limit the system overhead and complexity.

In embodiments, the RCS may also be composed from UEs camped on the same cell as the target UE. That may simplify the system design. However, it may limit potential optimization gain because inter-cell relay paths may be excluded from the best path selection. In embodiments, UEs from the neighboring cells may be included into the RCS and may potentially provide more performance benefits from relay operation. In embodiments, the serving cell of Relay UE may be transparent for Remote UE, and Relay UE may serve as a Relay for multiple cells.

In embodiments, once RCS is formed, then for the target UE, a relay or cellular path may be selected for data transmission. The path selection criterion may be different for different use cases and may be configured by the network. For example, the network may configure the relay selection criterion based on minimization of UE energy consumption or based on maximization of data throughput.

In embodiments, the support of maximum link capacity/data rate may be implemented as follows. In embodiments, for each UE inside the RCS, the coarse 2-hop path capacity may be estimated using the SL-RSRQ measurements. This capacity value may be compared to the cellular link capacity of the target UE. If the predicted capacity of the relay path is better than the cellular path, then the path may be switched to the relay one. The relay path with maximum capacity among RCS may be selected. In case the selected path capacity becomes worse than another relay path or the cellular path, the current relay path may be switched to the best one. To avoid a ping-pong effect, an offset for reselection of a relay path may be introduced.

In embodiments, multi-connectivity operation and/or path aggregation is enabled to increase user throughput.

Measurements for Inter-Cell Relay Path Selection and/or Aggregation

Figure 6:
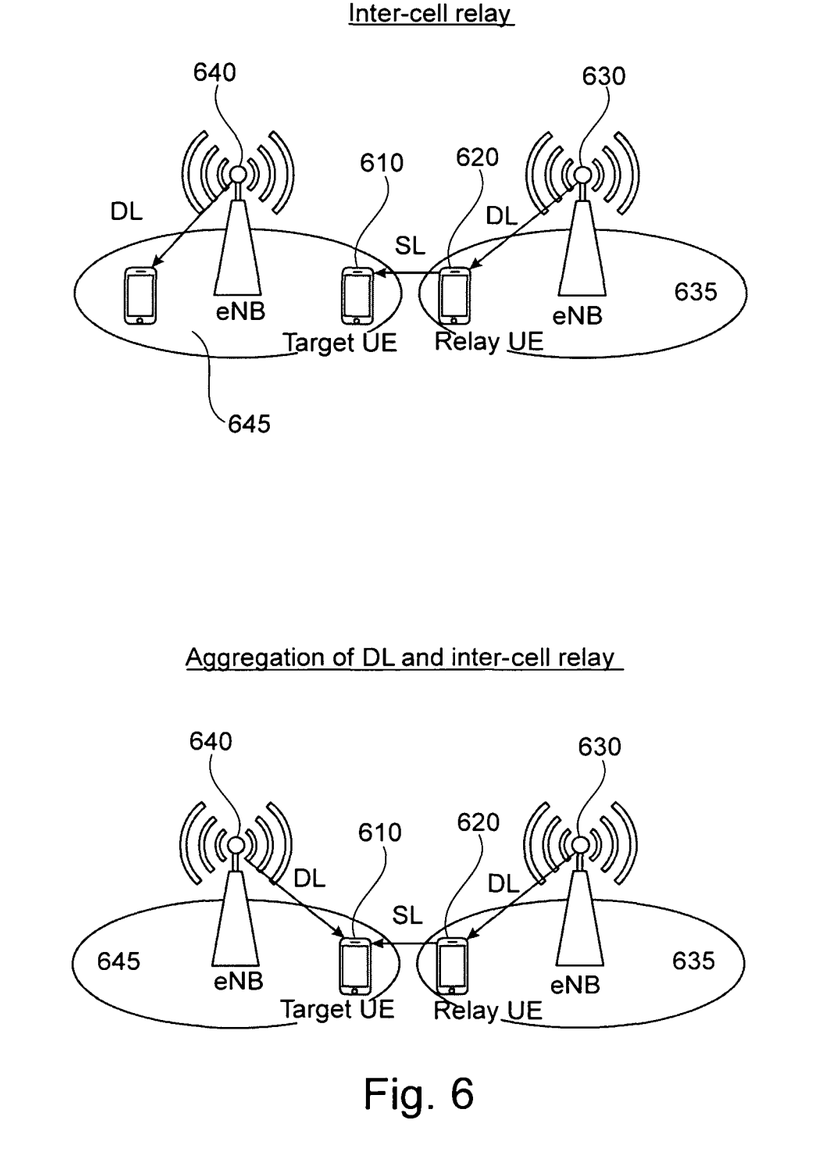
FIG. 6 illustrates inter-cell relay scenarios with multi-connectivity and path aggregation support.

In this subsection, specific measurements for the case of inter-cell relaying may be discussed. The considered scenario is shown in FIG. 6.

In embodiments, the target UE 610 may receive/transmit relay traffic from/to a relay UE 620 camped on another cell. The main difference comparing to the intra-cell scenario, may be the presence of DL inter-cell interference triggered by enabling relay operation. Because the DL interference may be triggered by the relay path scheduling decision, its impact may be controlled. In embodiments, to control the impact from the triggered inter-cell interference, the following measurements may be used.

Inter-cell RSRP, RSRQ, RSSI of cellular link—a relay candidate UE 620 may report to the target UE 610 its cellular measurements for both serving cell 635 (or the relay candidate UE 620) and neighboring cells. Alternatively, this information may be shared via X2 interface directly to the neighboring eNB (serving eNB of the target UE) 640.

The target UE (610) or eNB (640) may apply a decision rule based on the reported inter-cell measurements of RSRP, RSRQ, RSSI of cellular link conducted by Relay UE (620) and/or Target UE (610). For example, if RSRP from the particular cell may be above some threshold and/or RSRP from the serving cell to the relay candidate 620 may be above some threshold, then the inter-cell relay candidate 620 may not be included to the RCS because its activation may cause DL interference higher than some configured value. In embodiments, the DL inter-cell interference due to relay path activation may not cause DL interference to the target UE 610, that may be also derived based on RSRP/RSRQ measurements from neighbor cell 635. In embodiments, the inter-cell measurements may be used to estimate RSRQ in the presence of inter-cell interference and may use it similarly to the previous example in order to select a relay candidate 620. The measurements for serving cell 645 and neighboring cells may be broadcasted by Relay UE 620 in the PSDCH channel (in case of autonomous Relay UE 620 selection) or may be provided to an eNB/network for coordinated relay selection and path switching.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

Figure 7:
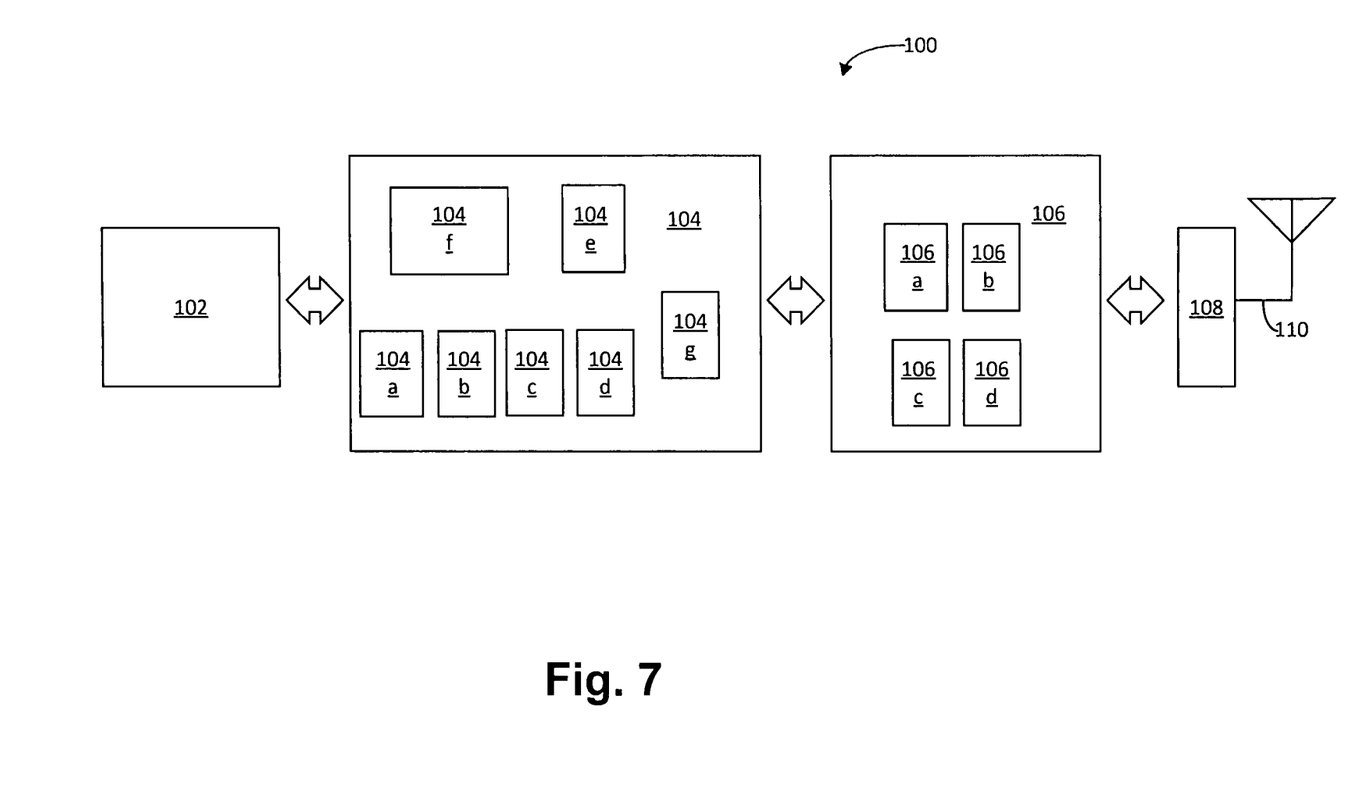
FIG. 7 illustrates example components in accordance with some examples.

Embodiments described herein may be implemented into a system using any suitably configured hardware and/or software. FIG. 7 illustrates, for one embodiment, example components of an electronic device 100. In embodiments, the electronic device 100 may be a user equipment (UE), an evolved NodeB (eNB), and the like. In some embodiments, the electronic device 100 may include application circuitry 102, baseband circuitry 104, Radio Frequency (RF) circuitry 106, front-end module (FEM) circuitry 108 and one or more antennas 110, coupled together at least as shown.

The application circuitry 102 may include one or more application processors. For example, the application circuitry 102 may include circuitry such as, but not limited to, one or more single-core or multi-core processors. The processor(s) may include any combination of general-purpose processors and dedicated processors (e.g., graphics processors, application processors, etc.). The processors may be coupled with and/or may include memory/storage and may be to execute instructions stored in the memory/storage to enable various applications and/or operating systems to run on the system.

The baseband circuitry 104 may include circuitry such as, but not limited to, one or more single-core or multi-core processors. The baseband circuitry 104 may include one or more baseband processors and/or control logic to process baseband signals received from a receive signal path of the RF circuitry 106 and to generate baseband signals for a transmit signal path of the RF circuitry 106. Baseband processing circuitry 104 may interface with the application circuitry 102 for generation and processing of the baseband signals and for controlling operations of the RF circuitry

106. For example, in some embodiments, the baseband circuitry 104 may include a second generation (2G) baseband processor 104a, third generation (3G) baseband processor 104b, fourth generation (4G) baseband processor 104c, and/or other baseband processor(s) 104d for other existing generations, generations in development or to be developed in the future (e.g., fifth generation (5G), 6G, etc.). The baseband circuitry 104 (e.g., one or more of baseband processors 104a-d) may handle various radio control functions that enable communication with one or more radio networks via the RF circuitry 106. The radio control functions may include, but are not limited to, signal modulation/demodulation, encoding/decoding, radio frequency shifting, etc. In some embodiments, modulation/demodulation circuitry of the baseband circuitry 104 may include Fast-Fourier Transform (FFT), precoding, and/or constellation mapping/demapping functionality. In some embodiments, encoding/decoding circuitry of the baseband circuitry 104 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 104 may include elements of a protocol stack such as, for example, elements of an evolved universal terrestrial radio access network (EUTRAN) protocol including, for example, physical (PHY), media access control (MAC), radio link control (RLC), packet data convergence protocol (PDCP), and/or radio resource control (RRC) elements. A central processing unit (CPU) 104e of the baseband circuitry 104 may be to run elements of the protocol stack for signaling of the PHY, MAC, RLC, PDCP and/or RRC layers. In some embodiments, the baseband circuitry may include one or more audio digital signal processor(s) (DSP) 104f. The audio DSP(s) 104f may be include elements for compression/decompression and echo cancellation and may include other suitable processing elements in other embodiments.

The baseband circuitry 104 may further include memory/storage 104g. The memory/storage 104g may be used to load and store data and/or instructions for operations performed by the processors of the baseband circuitry 104. Memory/storage for one embodiment may include any combination of suitable volatile memory and/or non-volatile memory. The memory/storage 104g may include any combination of various levels of memory/storage including, but not limited to, read-only memory (ROM) having embedded software instructions (e.g., firmware), random access memory (e.g., dynamic random access memory (DRAM)), cache, buffers, etc. The memory/storage 104g may be shared among the various processors or dedicated to particular processors.

Components of the baseband circuitry may be suitably combined in a single chip, a single chipset, or disposed on a same circuit board in some embodiments. In some embodiments, some or all of the constituent components of the baseband circuitry 104 and the application circuitry 102 may be implemented together such as, for example, on a system on a chip (SOC).

In some embodiments, the baseband circuitry 104 may provide for communication compatible with one or more radio technologies. For example, in some embodiments, the baseband circuitry 104 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 104 is to support radio communications of more than one wireless protocol may be referred to as multi-mode baseband circuitry.

RF circuitry 106 may enable communication with wireless networks using modulated electromagnetic radiation through a non-solid medium. In various embodiments, the RF circuitry 106 may include switches, filters, amplifiers, etc. to facilitate the communication with the wireless network. RF circuitry 106 may include a receive signal path which may include circuitry to down-convert RF signals received from the FEM circuitry 108 and provide baseband signals to the baseband circuitry 104. RF circuitry 106 may also include a transmit signal path which may include circuitry to up-convert baseband signals provided by the baseband circuitry 104 and provide RF output signals to the FEM circuitry 108 for transmission.

In some embodiments, the RF circuitry 106 may include a receive signal path and a transmit signal path. The receive signal path of the RF circuitry 106 may include mixer circuitry 106a, amplifier circuitry 106b and filter circuitry 106c. The transmit signal path of the RF circuitry 106 may include filter circuitry 106c and mixer circuitry 106a. RF circuitry 106 may also include synthesizer circuitry 106d for synthesizing a frequency for use by the mixer circuitry 106a of the receive signal path and the transmit signal path. In some embodiments, the mixer circuitry 106a of the receive signal path may be to down-convert RF signals received from the FEM circuitry 108 based on the synthesized frequency provided by synthesizer circuitry 106d. The amplifier circuitry 106b may be to amplify the down-converted signals and the filter circuitry 106c may be a low-pass filter (LPF) or band-pass filter (BPF) to remove unwanted signals from the down-converted signals to generate output baseband signals. Output baseband signals may be provided to the baseband circuitry 104 for further processing. In some embodiments, the output baseband signals may be zero-frequency baseband signals, although this is not a requirement. In some embodiments, mixer circuitry 106a of the receive signal path may comprise passive mixers, although the scope of the embodiments is not limited in this respect.

In some embodiments, the mixer circuitry 106a of the transmit signal path may be to up-convert input baseband signals based on the synthesized frequency provided by the synthesizer circuitry 106d to generate RF output signals for the FEM circuitry 108. The baseband signals may be provided by the baseband circuitry 104 and may be filtered by filter circuitry 106c. The filter circuitry 106c may include a low-pass filter (LPF), although the scope of the embodiments is not limited in this respect.

In some embodiments, the mixer circuitry 106a of the receive signal path and the mixer circuitry 106a of the transmit signal path may include two or more mixers and may be arranged for quadrature downconversion and/or upconversion respectively. In some embodiments, the mixer circuitry 106a of the receive signal path and the mixer circuitry 106a of the transmit signal path may include two or more mixers and may be arranged for image rejection (e.g., Hartley image rejection). In some embodiments, the mixer circuitry 106a of the receive signal path and the mixer circuitry 106a may be arranged for direct downconversion and/or direct upconversion, respectively. In some embodiments, the mixer circuitry 106a of the receive signal path and the mixer circuitry 106a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 106 may include analog-to-digital converter (ADC) and digital-to-analog converter (DAC) circuitry and the baseband circuitry 104 may include a digital baseband interface to communicate with the RF circuitry 106.

In some dual-mode embodiments, a separate radio IC circuitry may be provided for processing signals for each spectrum, although the scope of the embodiments is not limited in this respect.

In some embodiments, the synthesizer circuitry 106d may be a fractional-N synthesizer or a fractional N/N+1 synthesizer, although the scope of the embodiments is not limited in this respect as other types of frequency synthesizers may be suitable. For example, synthesizer circuitry 106d may be a delta-sigma synthesizer, a frequency multiplier, or a synthesizer comprising a phase-locked loop with a frequency divider.

The synthesizer circuitry 106d may be to synthesize an output frequency for use by the mixer circuitry 106a of the RF circuitry 106 based on a frequency input and a divider control input. In some embodiments, the synthesizer circuitry 106d may be a fractional N/N+1 synthesizer.

In some embodiments, frequency input may be provided by a voltage controlled oscillator (VCO), although that is not a requirement. Divider control input may be provided by either the baseband circuitry 104 or the applications processor 102 depending on the desired output frequency. In some embodiments, a divider control input (e.g., N) may be determined from a look-up table based on a channel indicated by the applications processor 102.

Synthesizer circuitry 106d of the RF circuitry 106 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 106d may be to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 106 may include an IQ/polar converter.

FEM circuitry 108 may include a receive signal path which may include circuitry to operate on RF signals received from one or more antennas 110, amplify the received signals and provide the amplified versions of the received signals to the RF circuitry 106 for further processing. FEM circuitry 108 may also include a transmit signal path which may include circuitry to amplify signals for transmission provided by the RF circuitry 106 for transmission by one or more of the one or more antennas 110.

In some embodiments, the FEM circuitry 108 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 106). The transmit signal path of the FEM circuitry 108 may include a power amplifier (PA) to amplify input RF signals (e.g., provided by RF circuitry 106), and one or more filters to generate RF signals for subsequent transmission (e.g., by one or more of the one or more antennas 110.

In some embodiments, the electronic device 100 may include additional elements such as, for example, memory/storage, display, camera, sensor, and/or input/output (I/O) interface. In some embodiments, the electronic device 100 may be incorporated in a UE, the UE also having one or more of memory/storage, a display, a camera, a sensor, or an input/output (I/O) interface.

In some embodiments, the electronic device may be included in an eNB. In such cases, the eNB may also include at least one of an interface or connection for communication with a core network. In some embodiments, the interface or connection may include one or more of an S1-MME interface, an S1-U interface, or an Ethernet connection.

In some embodiments, the electronic device 100 may be configured to perform one or more processes, techniques, and/or methods as described herein, or portions thereof.

The electronic device 100 may include receive circuitry to receive an indication of D2D resources. This circuitry may, for example, include or be included in RF circuitry 106 or baseband circuitry 104 described above. In some examples the receive circuitry is part of the application circuitry 102, e.g. arranged to receive a signal or information from the baseband circuitry 104.

The electronic device may include processing circuitry, for example within the application circuitry 102. The processing circuitry may be arranged to evaluate a time and frequency selective measurement of one or more of the D2D resources.

The receive circuitry and processing circuitry may include hardware, software and/or firmware components, as described above in relation to the application circuitry 102.

According to some examples, the electronic device may include circuitry to produce an indication of one or more subframes. For example, the indication may be a grant of D2D transmission resources, an indication of subframes allocated for PSCCH and associated PSSCH pools, a measurement configuration specifying a subframe measurement set (which has not necessarily been assigned for D2D communication), or a subframe measurement pattern.

The electronic device may further include circuitry to receive a time and frequency selective measurement of interference specific to the one or more indicated subframes. The measurement may be in accordance with the measurements described herein.

The circuitry to produce the indication and the circuitry to receive may be part of the application circuitry 102, or may have a similar structure to the application circuitry 102, described above. The circuitry to produce the indication and the circuitry to receive may include hardware, software and/or firmware components, as described above in relation to the application circuitry 102.

Figure 8:
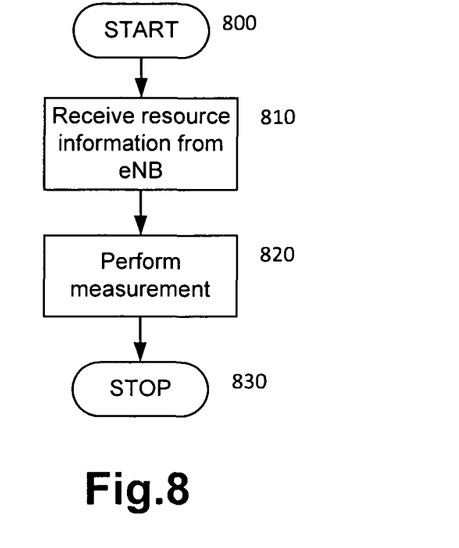
FIG. 8 illustrates a method according to some examples.

FIG. 8 illustrates a method according to some examples. The method may be performed by a UE or by an electrical device, which may be suitable for use in a UE. The method begins at 800, and at 810 information is received from an eNB regarding resources. The information may be received directly from the eNB or may be received via other components (such as other radio equipment and radio processing components connected with the device) or other entities (such as a relay device). At 820 the device may perform a time and frequency selective measurement of one or more of the resources (e.g. as described above). The measurement may be indicative of an interference environment of the resource. The method may then terminate at 830.

In some examples the measurement may be used by the UE to schedule transmission and/or reception of D2D communications. In some examples the measurement may be reported to an eNB or another UE, such as a D2D transmitting UE.

Figure 9:
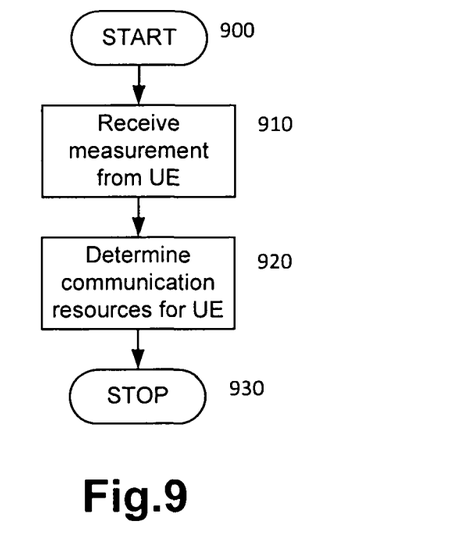
FIG. 9 illustrates a method according to some examples.

FIG. 9 illustrates a method according to some examples. The method may be performed by a eNB or by an electrical device, which may be suitable for use in a eNB. The method begins at 900 and at 910 measurement information is received from a UE. The measurement information may be indicative of a time and frequency selective measurement associated with one or more resources. The measurement may characterize an interference environment associated with the resources. The measurement may be as described previously herein.

At 920 a resource allocation is determined for the UE, based on the measurement. Other information, such as measurements by other UEs or of other resources may also be used in the determination of the resource allocation. The resource allocation may include, for example, determining that the UE is to communicate via sidelink or via cellular communication, or both. The allocation may include a determination of radio resources for communication by the UE. The allocation may include a determination of resource pools to be used by the UE and other UEs. The allocation may include determining one or more relay UEs via which the UE is to communicate.

Throughout the description, reference has been made to "device-to-device" or "D2D", however, reference may equally be made to "proximity services (ProSe)." Accordingly, proximity services/ProSe may be used interchangeably with device-to-device/D2D herein.

Examples

Example 1 may include a method for a evolved NodeB (eNB) to operate in device-to-device (D2D) relay enabled radio-aware mode comprising of:
  configuring, by the eNB, resources for time and frequency selective sidelink reference signal strength indicator measurements;
  configuring, by the eNB, resources for time and frequency selective sidelink interference signal strength indicator measurements;
  configuring, by the eNB, resources for time and frequency selective sidelink reference signal received power indicator measurements;
  configuring, by the eNB, resources for time and frequency selective sidelink reference signal received quality indicator measurements;
  receiving, by the eNB, sidelink time and frequency selective measurements;
  receiving, by the eNB, inter-cell cellular RSRP/RSRQ measurements from served UEs;
  receiving, be the eNB, inter-cell cellular RSRP/RSRQ measurements from UEs served by neighboring eNBs;
  using, by the eNB, the sidelink measurements to select relay;

Example 2 may include the method of example 1 or some other example herein, wherein resources for time and frequency selective sidelink reference signal strength indicator measurements (SL-RSSI), interference signal strength indicator (SL-ISSI), reference signal received power indicator (SL-RSRP), reference signal received quality indicator (SL-RSRQ), are to UEs by means subframe measurement sets signaled by higher layer control signaling.

Example 3 may include the method of example 2 or some other example herein, wherein SL-RSSI/SL-ISSI/SL-RSRP/SL-RSRQ measurements resources are configured with measurement gaps by means of duration, period and offset relative to system frame number zero.

Example 4 may include the method of example 2 or some other example herein, wherein SL-RSSI/SL-ISSI/SL-RSRP/SL-RSRQ subframe measurement sets are configured using a bitmap or repeated bitmaps.

Example 5 may include the method of example 2 or some other example herein, wherein SL-RSSI/SL-ISSI/SL-RSRP/SL-RSRQ measurements are done in wideband or narrowband.

Example 6 may include the method of example 2 or some other example herein, wherein measurements are reported by a UE to the eNB or to another UE.

Example 7 may include the method of example 6 or some other example herein, wherein measurements are used to select time resource pattern for transmission.

Example 8 may include the method of example 2 or some other example herein, wherein SL-ISSI measurement resources are configured using coordination signaling across cells.

Example 9 may include the method of example 2 or some other example herein, wherein configurations of demodulation reference signals used by D2D transmitters is signaled by higher layer to measure SL-RSRP.

Example 10 may include the method of example 2 or some other example herein, wherein SL-RSRQ measurements are derived from SL-RSRP and SL-ISSI measurements or SL-RSSI.

Example 11 may include the method of example 10 or some other example herein, wherein SL-RSRQ is mapped to a CQI value to predict capacity of a D2D link in presence of a particular set of interference sources.

Example 12 may include the method of example 1 or some other example herein, wherein measurements are used to form Relay Candidate Set base on a configured relay selection criterion.

Example 13 may include the method of example 12 or some other example herein, wherein the criterion is configured separately for uplink and downlink.

Example 14 may include the method of example 1 or some other example herein, wherein the inter-cell RSRP, RSRQ, RSSI measurements are used for inter-cell relay selection and path aggregation.

Example 15 may include an apparatus comprising means to perform one or more elements of a method described in or related to any of examples 1-14, or any other method or process described herein.

Example 16 may include one or more computer-readable media comprising instructions to cause an electronic device, upon execution of the instructions by one or more processors of the electronic device, to perform one or more elements of a method described in or related to any of examples 1-14, or any other method or process described herein. In some examples the media may be non-transitory or non-transient computer-readable media.

Example 17 may include an apparatus comprising logic, modules, and/or circuitry to perform one or more elements of a method described in or related to any of examples 1-14, or any other method or process described herein.

Example 18 may include a method, technique, or process as described in or related to any of examples 1-14, or portions or parts thereof.

Example 19 may include a method of communicating in a wireless network as shown and described herein.

Example 20 may include a system for providing wireless communication as shown and described herein.

Example 21 may include a device for providing wireless communication as shown and described herein.

Example 22 may include an electronic device for device-to-device (D2D) communication comprising:
receive circuitry to receive an indication of D2D resources for D2D communication; and
processing circuitry to evaluate a time and frequency selective measurement of one or more of the D2D resources, based on the indication.

Example 23 may include the electronic device of example 22, wherein the indication of D2D resources is selected from:
a grant of D2D resources for transmission by a D2D transmitter,
an indication of subframes allocated for physical sidelink control channel (PSCCH) and associated physical sidelink shared channel (PSSCH) pools,
a measurement configuration specifying a subframe measurement set, or
a subframe measurement pattern.

Example 24 may include the electronic device of example 22, wherein the indication of D2D resources is configured with measurement gaps by means of duration, period and offset relative to system frame number zero.

Example 25 may include the electronic device of any one of examples 22 to 24, wherein the processing circuitry is further configured to:
cause the measurement to be reported to an evolved NodeB (eNB) from which the indication was received,
cause the measurement to be reported to an eNB other than the eNB from which the indication was received,
cause the measurement to be reported to a relay User Equipment (UE), or
select, based on the measurement, a time resource for D2D transmission by the electronic device.

Example 26 may include the electronic device of any one of examples 22 to 25, wherein the measurement includes one or more of:
Sidelink Reference Signal Received Power (SL-RSRP),
Sidelink Interference Signal Strength Indicator (SL-ISSI),
Sidelink Received Signal Strength Indicator (SL-RSSI),
Sidelink Reference Signal Received Quality (SL-RSRQ).

Example 27 may include the electronic device of example 26, wherein the processing circuitry is further to derive SL-RSRQ measurement from SL-RSRP and either SL-ISSI or SL-RSSI measurements.

Example 28 may include the electronic device of example 26 or example 27, wherein the processing circuitry is further to map the SL-RSRQ measurement to a channel quality indication (CQI) value to predict capacity of a D2D link in presence of a particular set of interference sources.

Example 29 may include the electronic device of any one of examples 22 to 28, wherein the processing circuitry is further to form a Relay Candidate Set based on the measurement.

Example 30 may include the electronic device of any one of examples 22 to 29, wherein the measurement is performed only in relation to subframes indicated by the indication of resources.

Example 31 may include a User Equipment (UE), comprising the electronic device of any one of examples 22 to 30, and further comprising one or more of: a display, a camera, a sensor, an input/output (I/O) interface.

Example 32 may include an electronic device for device-to-device (D2D) communication comprising:
circuitry to produce an indication of one or more subframes, the indication for transmission to a user equipment (UE); and
circuitry to receive from the UE a time and frequency selective measurement of interference specific to the one or more subframes.

Example 33 may include the electronic device of example 32, wherein the received measurement characterises a sidelink communication environment at the indicated subframes.

Example 34 may include the electronic device of any one of examples 32 to 33, wherein the electronic device is to evaluate an impact from different types of interference based on the received measurement.

Example 35 may include the electronic device of any one of examples 32 to 34, wherein the electronic device is to receive a further time and frequency selective measurement from a further UE, the further UE being served by a neighbouring evolved NodeB (eNB).

Example 36 may include the electronic device of any one of examples 32 to 35, wherein the measurement includes one or more of:
Sidelink Reference Signal Received Power (SL-RSRP),
Sidelink Interference Signal Strength Indicator (SL-ISSI),
Sidelink Received Signal Strength Indicator (SL-RSSI),
Sidelink Reference Signal Received Quality (SL-RSRQ).

Example 37 may include the electronic device of example 36, wherein the electronic device is further to map the SL-RSRQ measurement to a channel quality indication (CQI) value to predict capacity of a D2D link in presence of a particular set of interference sources.

Example 38 may include the electronic device of any one of examples 32 to 37, wherein the electronic device is further to form a Relay Candidate Set based on the measurement.

Example 39 may include an evolved NodeB (eNB) comprising the apparatus of any one of examples 32 to 38, and further comprising at least one of an interface or connection for communication with a core network.

Example 40 may include one or more computer-readable media comprising instructions to cause an electronic device, upon execution of the instructions by one or more processors of the electronic device, to:
receive information about resources from an evolved NodeB (eNB); and
perform a time and frequency selective measurement of one or more of the resources, the measurement indicative of an interference environment of the resource. In some examples the media may be non-transitory or non-transient computer-readable media.

Example 41 may include the media of example 40, wherein the information about resources is selected from:
a grant of device-to-device (D2D) resources for transmission by a D2D transmitter, an indication of subframes allocated for physical sidelink control channel (PSCCH) and associated physical sidelink shared channel (PSSCH) pools,
a measurement configuration specifying a subframe measurement set, or
a subframe measurement pattern.

Example 42 may include the media of example 40 or 41, wherein the measurement includes one or more of:
Sidelink Reference Signal Received Power (SL-RSRP),
Sidelink Interference Signal Strength Indicator (SL-ISSI),
Sidelink Received Signal Strength Indicator (SL-RSSI),
Sidelink Reference Signal Received Quality (SL-RSRQ).

Example 43 may include one or more computer-readable media comprising instructions to cause an electronic device, upon execution of the instructions by one or more processors of the electronic device, to:
receive from a User Equipment (UE) a time and frequency selective measurement of one or more radio resources; and
determine a resource allocation for the UE based on the measurement. In some examples the media may be non-transitory or non-transient computer-readable media.

Example 44 may include the media of example 43, further to cause the electronic device to:
send, prior to the receiving, information on the radio resource to the UE to cause to the UE to perform the measurement, wherein the information is selected from:
a grant of device-to-device (D2D) resources for transmission by a D2D transmitter,
an indication of subframes allocated for physical sidelink control channel (PSCCH) and associated physical sidelink shared channel (PSSCH) pools,
a measurement configuration specifying a subframe measurement set, or
a subframe measurement pattern.

Example 45 may include the media of example 43 or 44, wherein the measurement includes one or more of:
Sidelink Reference Signal Received Power (SL-RSRP),
Sidelink Interference Signal Strength Indicator (SL-ISSI),
Sidelink Received Signal Strength Indicator (SL-RSSI),
Sidelink Reference Signal Received Quality (SL-RSRQ).

Example 46 may include a method performed by a user equipment (UE) for Device-to-Device (D2D) communication, the method comprising:
receiving information about resources from an evolved NodeB (eNB); and
performing a time and frequency selective measurement of one or more of the resources, the measurement indicative of an interference environment of the resource.

Example 47 may include the method of example 46, wherein the indication of D2D resources is selected from:
a grant of D2D resources for transmission by a D2D transmitter,
an indication of subframes allocated for physical sidelink control channel (PSCCH) and associated physical sidelink shared channel (PSSCH) pools,
a measurement configuration specifying a subframe measurement set, or
a subframe measurement pattern.

Example 48 may include the method of example 46 or 47, wherein the measurement includes one or more of:
Sidelink Reference Signal Received Power (SL-RSRP),
Sidelink Interference Signal Strength Indicator (SL-ISSI),
Sidelink Received Signal Strength Indicator (SL-RSSI),
Sidelink Reference Signal Received Quality (SL-RSRQ).

Example 49 may include a method performed by an evolved NodeB (eNB), the method comprising:
receiving from a User Equipment (UE) a time and frequency selective measurement of one or more radio resources; and
determining a resource allocation for the UE based on the measurement.

Example 50 may include the method of example 49, further comprising:
sending, prior to the receiving, information on the radio resource to the UE to cause to the UE to perform the measurement, wherein the information is selected from:
a grant of device-to-device (D2D) resources for transmission by a D2D transmitter,
an indication of subframes allocated for physical sidelink control channel (PSCCH) and associated physical sidelink shared channel (PSSCH) pools,
a measurement configuration specifying a subframe measurement set, or
a subframe measurement pattern.

Example 51 may include the method of example 49 or 50, wherein the measurement includes one or more of:
Sidelink Reference Signal Received Power (SL-RSRP),
Sidelink Interference Signal Strength Indicator (SL-ISSI),
Sidelink Received Signal Strength Indicator (SL-RSSI),
Sidelink Reference Signal Received Quality (SL-RSRQ).

Example 52 may include one or more computer-readable media comprising instructions to cause an electronic device, upon execution of the instructions by one or more processors of the electronic device, to perform one or more elements of a method described in relation to any one of examples 46 to 51. In some examples the media may be non-transitory or non-transient computer-readable media.

Example 53 may include an electronic device for communication, the device comprising:
means to receive an indication of device-to-device (D2D) resources for D2D communication; and
means to evaluate a time and frequency selective measurement of one or more of the D2D resources, based on the indication.

Example 54 may include an electronic device for communication comprising:
means to produce an indication of one or more subframes, the indication for transmission to a user equipment (UE); and
means to receive from the UE a time and frequency selective measurement of interference specific to the one or more subframes.

The foregoing description of one or more implementations provides illustration and description, but is not intended to be exhaustive or to limit the scope of the disclosure to the precise form disclosed. Modifications and variations are possible in light of the above teachings or may be acquired from practice of various implementations of the disclosure.

What is claimed is:

1. An electronic device for device-to-device (D2D) communication comprising:
receive circuitry to receive an indication of D2D resources for D2D communication; and
processing circuitry to evaluate a time and frequency selective measurement of one or more of the D2D resources, based on the indication,
wherein the time and frequency selective measurement includes a Sidelink Reference Signal Received Power (SL-RSRP) measurement and a Sidelink Interference Signal Strength Indicator (SL-ISSI) measurement or a Sidelink Received Signal Strength Indicator (SL-RSSI) measurement and the processing circuitry is further to derive a Sidelink Reference Signal Received Quality (SL-RSRQ) measurement from the SL-RSRP measurement and either the SL-ISSI measurement or the SL-RSSI measurement.

2. An electronic device for device-to-device (D2D) communication comprising:
receive circuitry to receive an indication of D2D resources for D2D communication; and
processing circuitry to evaluate a time and frequency selective measurement of one or more of the D2D resources, based on the indication,
wherein the time and frequency selective measurement includes a Sidelink Reference Signal Received Quality (SL-RSRQ) and the processing circuitry is further to map the SL-RSRQ measurement to a channel quality indication (CQI) value to predict capacity of a D2D link in presence of a particular set of interference sources.

3. The electronic device of claim 1, wherein the processing circuitry is further to form a Relay Candidate Set based on the time and frequency selective measurements.

4. The electronic device of claim 1, wherein the time and frequency selective measurements are performed only in relation to subframes indicated by the indications of the D2D resources.

5. An electronic device for device-to-device (D2D) communication comprising:
circuitry to produce an indication of one or more subframes, the indication for transmission to a user equipment (UE); and
circuitry to receive from the UE a time and frequency selective measurement of interference specific to the one or more subframes,
wherein the measurement includes a Sidelink Reference Signal Received Quality (SL-RSRQ) measurement and the electronic device is further to map the SL-RSRQ measurement to a channel quality indication (CQI) value to predict capacity of a D2D link in presence of a particular set of interference sources.

6. The electronic device of claim 5, wherein the received measurement characterises a sidelink communication environment at the indicated subframes.

7. The electronic device of claim 5, wherein the electronic device is to evaluate an impact from different types of interference based on the received measurement.

8. The electronic device of claim 5, wherein the electronic device is to receive a further time and frequency selective measurement from a further UE, the further UE being served by a neighbouring evolved NodeB (eNB).

9. The electronic device of claim 5, wherein the electronic device is further to form a Relay Candidate Set based on the measurement.

10. An evolved NodeB (eNB) comprising the apparatus of claim 5, and further comprising at least one of an interface or connection for communication with a core network.

* * * * *